United States Patent
Mitra et al.

(10) Patent No.: US 7,466,916 B2
(45) Date of Patent: Dec. 16, 2008

(54) HYBRID OPTICAL AND DATA NETWORKS

(75) Inventors: Debasis Mitra, Summit, NJ (US);
Anwar I. Walid, Watchung, NJ (US);
Qiong Wang, Millington, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 360 days.

(21) Appl. No.: 11/187,056

(22) Filed: Jul. 23, 2005

(65) Prior Publication Data
US 2007/0019955 A1   Jan. 25, 2007

(51) Int. Cl.
*H04B 10/20*  (2006.01)
*H04J 14/00*  (2006.01)

(52) U.S. Cl. .......................... 398/58; 398/74

(58) Field of Classification Search .............. 398/58, 398/74, 75; 370/254, 255
See application file for complete search history.

(56) References Cited

U.S. PATENT DOCUMENTS

| | | | |
|---|---|---|---|
| 6,141,325 A | 10/2000 | Gerstel | 370/238 |
| 6,823,104 B2 * | 11/2004 | Chauvin et al. | 385/24 |
| 2004/0120705 A1 * | 6/2004 | Friskney et al. | 398/5 |
| 2005/0002671 A1 * | 1/2005 | Smith et al. | 398/83 |
| 2005/0058064 A1 * | 3/2005 | Phelps et al. | 370/225 |
| 2005/0076173 A1 * | 4/2005 | Merril et al. | 711/100 |
| 2006/0126521 A1 * | 6/2006 | Hyndman et al. | 370/248 |
| 2007/0121507 A1 * | 5/2007 | Manzalini et al. | 370/235 |

FOREIGN PATENT DOCUMENTS

EP   0 982 901   3/2000

OTHER PUBLICATIONS

Di Sorte, D., "Minimum Price Inter-Domain Routing Algorithm," IEEE Communications Letters, vol. 6, No. 4, pp. 165-167, Apr. 2002.
PCT International Search Report dated Oct. 26, 2006, (PCT/US2006/027051) 4 pages.
Qiu, L. et al., "On Selfish Routing in Internet-Like Environments," SIGCOMM'03, Aug. 25-29, 2003, Karlsruhe, Germany, 12 pages, 2003.
Chiu, A.L. et al., "Traffic Grooming Algorithms for Reducing Electronic Multiplexing Costs in WDM Ring Networks," Journal of Lightwave Technology, vol. 18, No. 1, pp. 2-12, Jan. 2000.
Swallow, G. et al., "Generalize Multiprotocol Label Switching (GMPLS) User-Network Interface (UNI): Resource Reservation Protocol-Traffic Engineering (RSVP-TE) Support for the Overlay Model," The Internet Society, published online at http://www.ietf.org/shadow.html, 13 pages, 2004.

(Continued)

*Primary Examiner*—Dalzid Singh
(74) *Attorney, Agent, or Firm*—John F. McCabe

(57) ABSTRACT

A method includes transmitting a list of willingness-to-pays for optical data capacities to an optical network. The optical network has a set of gateway nodes connected directly to nodes of a data network. The optical network is configured to transmit data communications on a plurality of wavelength channels. Each willingness-to-pay represents a value for an optical data capacity between a corresponding pair of the gateway nodes of the optical network.

17 Claims, 6 Drawing Sheets

OTHER PUBLICATIONS

Gerstel, O. et al., "Cost-Effective Traffic Grooming in WDM Rings," IEEE/ACM Transactions on Networking, vol. 8, No. 5, pp. 618-630, Oct. 2000.

Kelly, F.P. et al., "Rate control for communication networks: shadow prices, proportional fairness and stability,"Journal of the Operational Research Society, vol. 49, pp. 237-252, 1998.

Liu, Y. et al., "On the Interaction Between Overlay Routing and Underlay Routing," IEEE Infocom 2005. IEEE Communications Society, pp. 2543-2553, Mar. 2005.

Low, S.H., "A Duality Model of TCP and Queue Management of Algorithms," IEEE/ACM Transactions on Networking, vol. 11, No. 4, pp. 525-536, Aug. 2003.

Mahajan, R. et al., "Towards Coordinated Interdomain Traffic Engineering," 6 pages, published online at: http://yuba.stanford.edu/HotNets-III/ at Third Workshop on Hot Topics in Networks, Nov. 2004.

Awduche, D. et al., "Overview and Principles of Internet Traffic Engineering," The Internet Society: Network Working Group, 71 pages, 2002.

Rajagopalan, B. et al., "IP over Optical Networks: A Framework," The Internet Society: Network Working Group, 48 pages, 2004.

Mannie, E., "Generalized Multi-Protocol Label Switching (GMPLS) Architecture," The Internet Society: Network Working Group, 69 pages, 2004.

Awduche, D.O., "Integrated Traffic Engineering in IP over Optical (IPO) Networks: Fundamental Concepts," SPIE ITCOM Conference, Boston, Massachusetts, 12 pages, Aug. 2002.

Rajagopalan, B. et al., "IP over Optical Networks: Architectural Aspects," IEEE Communications Magazine, pp. 94-102, Sep. 2000.

Geoffrion, A.M., "Generalized Benders Decomposition," Journal of Optimization Theory and Applications: vol. 10, No. 4, pp. 237-260, 1972.

Zhang et al., "Understanding the Interaction Between Overlay Routing and Traffic Engineering," Univ. of Mass. Publication available online at: www.cs.umass.edu, pp. 1-19, 2004.

\* cited by examiner

HYBRID OPTICAL AND DATA NETWORKS

BACKGROUND

1. Field of the Invention

The invention relates generally to optical networks and data networks.

2. Discussion of the Related Art

Herein, a hybrid communication network includes a data network and an optical network, wherein the optical transport network interconnects the data network. The data network is typically enabled by electronic routers and/or switches and typically employs a protocol, e.g., an Internet protocol, to enable routing of communications traffic between the nodes therein. The optical network is typically enabled by optical cross connects and provides multiple communication channels between nodes therein based on wavelength-division multiplexing (WDM). Some optical networks use a signaling and routing protocol e.g., generalized multi-protocol label switching (GMPLS).

In hybrid networks, the data and optical networks often have significant qualitative differences. The optical network often supports a much higher data transmission rate than the data network. In the optical and data networks, inter-node transmission rates may differ by an order of magnitude or more. Also, the data network often has a larger number of nodes than the optical network, e.g., an order of magnitude more nodes. The data network also typically has a denser topology. Due to these significant qualitative differences, joint optimization of the data and optical networks may be desirable in a hybrid network. Such joint optimization typically involves revealing information on the operational properties of the data and optical networks.

BRIEF SUMMARY

Various embodiments provide methods for optimizing hybrid communications networks that include a data network and an optical network. The methods involve exchanges of operations data related directly to an "overlay model" of the hybrid network. In particular, the exchanged operations data relates to a virtual optical architecture rather than to the physical architecture of either the data network or the optical network. These limited exchanges of operations data enable approximate optimizations of the performance of end-to-end communications in hybrid networks without the exchange of sensitive data on the physical architectures of the underlying data and optical networks.

A first aspect features a method that includes transmitting by a data network a list of willingness-to-pays for optical data capacities to an optical network that is configured to transmit data communications on a plurality of wavelength channels. The optical network has a set of gateway nodes connected directly to nodes of a data network. Each willingness-to-pay represents a value for an optical data capacity between a corresponding pair of the gateway nodes of the optical network.

A second aspect features a method that includes receiving in a multiple wavelength channel optical network a list of requests from a data network. Each request represents a value for increased optical data capacity between a corresponding pair of gateway nodes of the optical network. The method also includes producing a list of provisions for optical data capacities between the pairs of said gateway nodes based on said received list and transmitting said produced list of provisions for optical data capacities to the data network.

BRIEF DESCRIPTION OF THE DRAWINGS

Various embodiments are described more fully by the Figures and Detailed Description of Illustrative Embodiments. The inventions may however, be embodied in various forms and are not limited to embodiments described in the Figures and Detailed Description of Illustrative Embodiments.

In the Figures and text, like reference numerals indicate elements with similar functions.

DETAILED DESCRIPTION OF ILLUSTRATIVE EMBODIMENTS

In a hybrid communication network, the sharing of operations data between the component data and optical networks is often undesirable, because the component networks are owned by different organizations in the same or separate companies. In particular, knowledge of such operations data can provide advantages to competitors. Operations data that offers such competitive advantages often includes the physical architectures of the component networks. The desirability to keep such operations data as proprietary is especially great when direct competitors own the component optical and data networks of the hybrid network.

Unfortunately, limiting exchanges of operations data may reduce performance in such hybrid communication networks. Indeed, optimizing the optical network and the data network separately would typically lower the obtainable end-to-end quality of service for data communications in a hybrid communication network.

To obtain a high end-to-end quality-of-service, various embodiments enable joint optimization of such hybrid networks based on overlay structures. The methods involve sharing optimization steps between the data and the optical networks, wherein the optimization steps are based on limited exchanges of operations data. The methods however, enable component data and optical networks to use their own detailed operations data during the optimizations. Nevertheless, the exchanges of operations data are limited to characteristics of an overlay structure associated with a virtual optical network. For these reasons, the component networks can keep their physical architectural data as proprietary whereas the actual optimizations still benefit from the use of such basic operations data.

Figure 1:
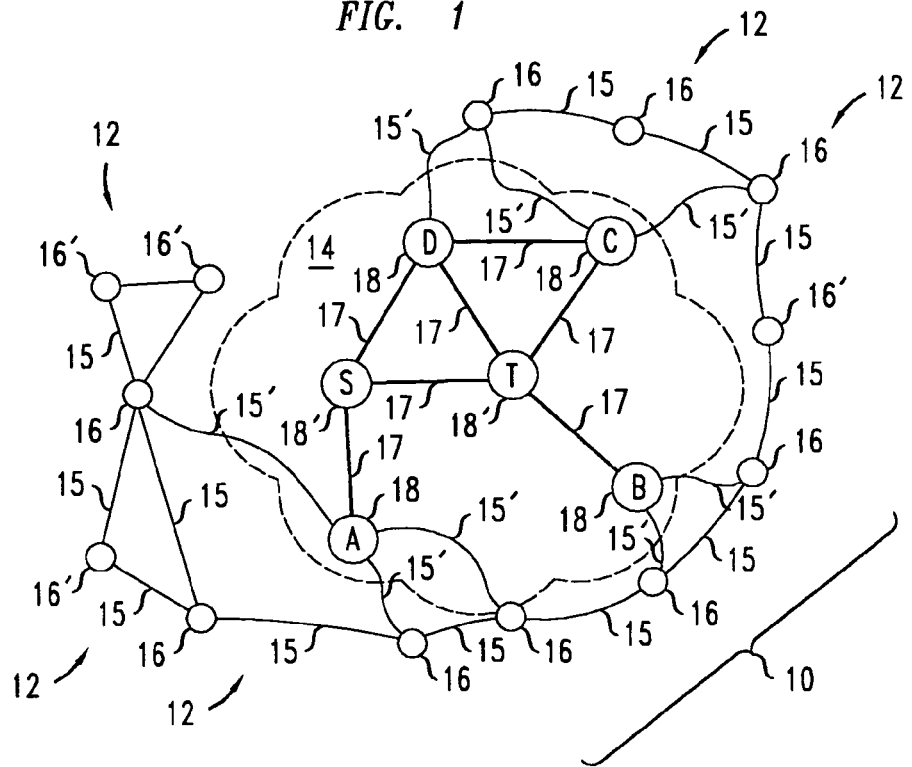
FIG. 1 is a block diagram illustrating an exemplary hybrid network that includes interconnected data and optical networks.
Figure 2:
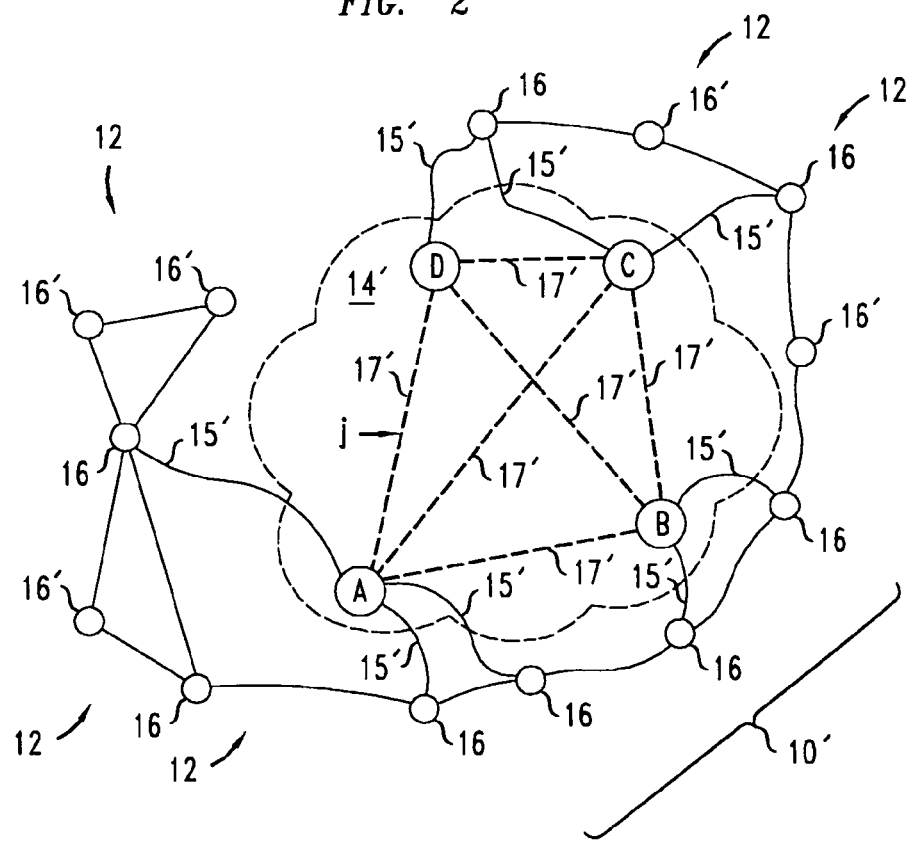
FIG. 2 is a block diagram illustrating the overlay structure corresponding to the hybrid network of FIG. 1.

FIGS. 1 and 2 illustrate the "overlay model" for an exemplary hybrid communication network 10. The various embodiments are however, not limited to the specific physical topology or the specific numbers of nodes in the exemplary hybrid communication network 10.

FIG. 1 schematically shows the exemplary hybrid communication network 10 that will be described for illustrative purposes. The hybrid communication network 10 includes a data network 12, e.g., a data access network, and an optical transport network 14, e.g., a core optical network. The data network 12 includes a collection of electronic links 15, 15', internal nodes 16', and edge nodes 16. The electronic links 15 partially or fully interconnect the nodes 16, 16' to able electronic routing of data communications packets along between the nodes 16, 16' via a routing protocol, e.g., a TCP/IP protocol. The optical network 14 includes a collection of optical fiber links 17, edge nodes 18, i.e., nodes A, B, C, and D, and internal nodes 18', i.e., nodes S and T. The optical fiber links 17 optically interconnect the nodes 18, 18' of the optical network 14. Some optical nodes 18, 18', e.g., all edge nodes 18, have a multi-wavelength optical transceiver that is capable of being a source and a destination for optical communications on multiple wavelength-channels, e.g., WDM channels. Exemplary edge nodes 18 are optical user network interfaces (optical UNIs). The optical nodes 18, 18' may be able to retransmit received optical communications on a single optical path or be able to split such received optical communications for retransmission along multiple optical paths. The optical nodes 18, 18' may or may not use a signaling and routing protocol, e.g., GMPLS.

The edge nodes 16 of the data network 12 physically connect either directly or by a UNI to the edge nodes 18 of the optical network 14 via electronic links 15'. The edge nodes 18 of the optical network 14 are configured to convert received electronic data communications packets to optical packets and vice-versa. Thus, the edge nodes 18 are gateway nodes that enable the data network 12 to use communication paths that include optical links 17 of the optical network 14. The communication paths between source and destination nodes 16, 16' of the data network 12 may include physical links 15, 15' in only the data network 12 or combinations of physical links 15, 15', 17 in both the data and optical networks 12, 14.

In the hybrid network 10, the optical network 14 can dynamically reconfigure wavelength-channels provisioned on the individual optical links 17 therein. In particular, the optical network can add or remove wavelength-channels and/or assign and unassign wavelength-channels for data communication traffic originating in the data network 12. By selectively adding or removing wavelength-channels on various optical links 17, the optical network is able to adapt to accommodate changes in the distribution of data traffic carried therein.

FIG. 2 illustrates the overlay structure 10' for the exemplary hybrid network 10 of FIG. 1. In the overlay structure 10', the optical network 14 is replaced by a virtual optical network 14' that includes only the edge nodes 18, i.e., gateway nodes A-D, and virtual optical pipes 17'. Each pair of the gateway nodes A-D is optically connected by a corresponding one of the optical pipes 17'. The a-th optical pipe has a provisioned optical traffic capacity, $w_a$.

Figure 3:
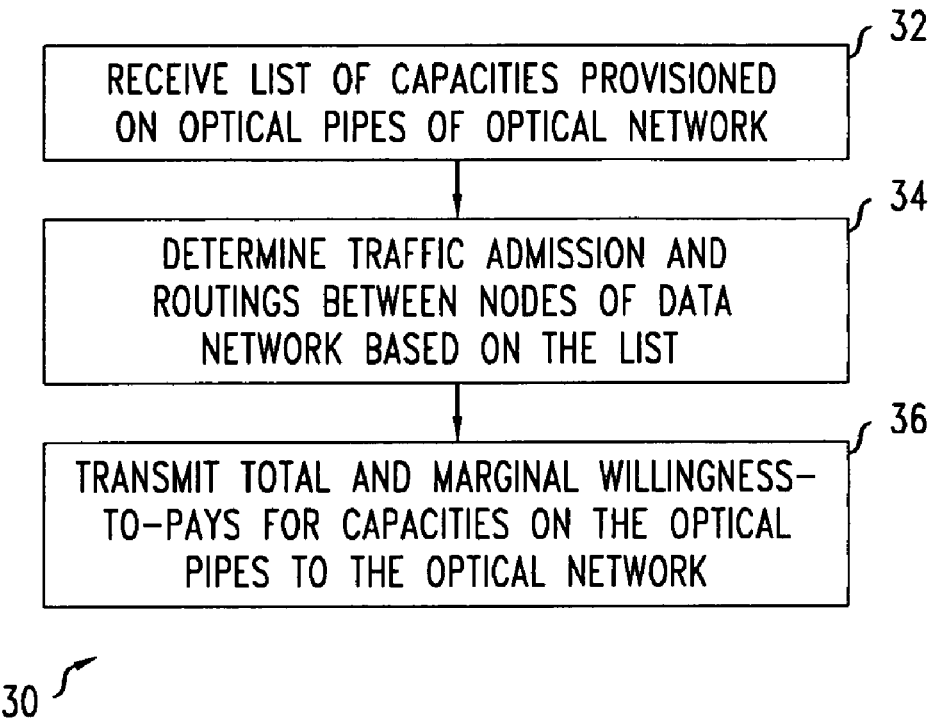
FIG. 3 is a flow chart illustrating steps performed by the data network of FIG. 1 during a joint optimization of end-to-end data communications in the hybrid network of FIG. 1.
Figure 4:
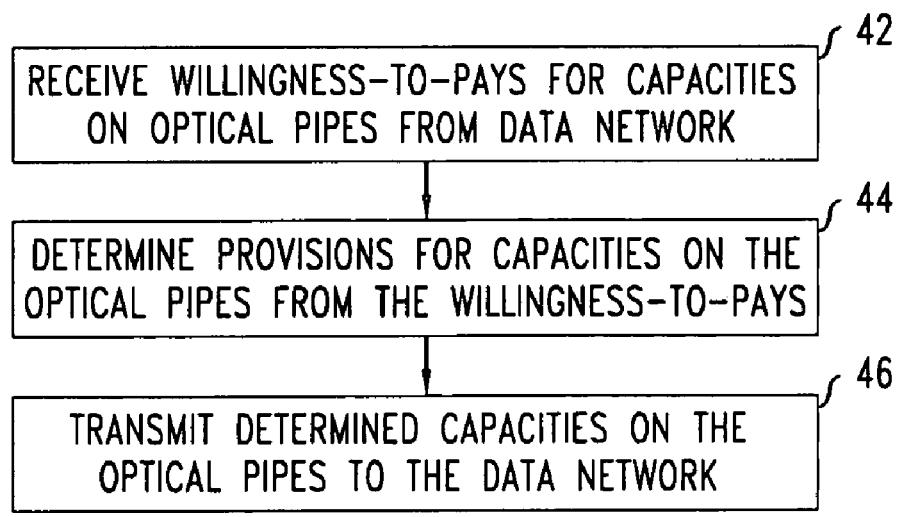
FIG. 4 is a flow chart illustrating steps performed by the optical network of FIG. 1 during the joint optimization of end-to-end data communications in the hybrid network of FIG. 1.
Figure 5:
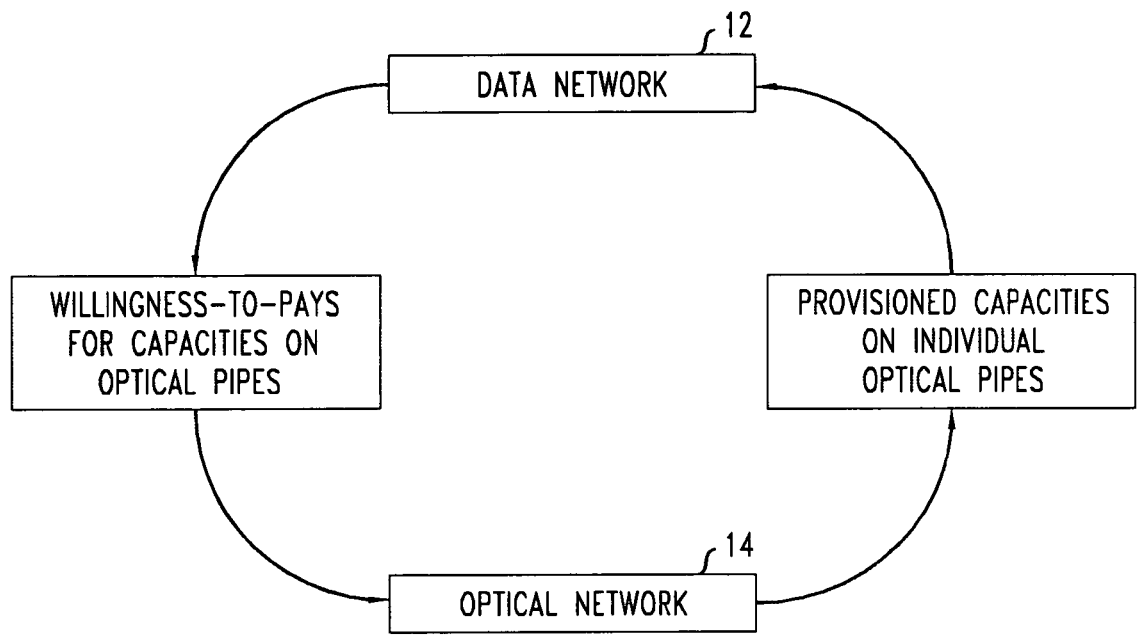
FIG. 5 illustrates the exchanges of operations data between the data network and optical network of FIG. 1 during the joint optimization of FIGS. 3 and 4.

FIGS. 3-4 illustrate an iterative method for optimizing admission control and end-to-end routing of data communications traffic in the hybrid network 10 of FIG. 1. In each iteration of the method, the data network 12 performs a sequence 30 of steps, and the optical network 14 performs a sequence of steps 40. The sequences 30, 40 involve limited transfers between the data and optical networks 12, 14 of operations data that is associated with the overlay structure 10' as shown in FIG. 5. Each sequence of steps 30 and 40 may be performed at a centralized controller for the associated data network 12 and the associated optical network 14, respectively, or at the individual nodes 16-16' and 18-18' of these two networks 12, 14.

FIG. 3 illustrates the sequence 30 of steps that the data network 12 performs during one iteration of the optimization method.

The sequence 30 includes receiving from the optical network 14 a list 50 of optical data capacities, i.e., bits per second, that are provisioned for the data network 12 (step 32). Each element of the list is a data capacity that is provisioned on a corresponding one of the optical pipes 17', wherein each data capacity is provisioned for data communications between pairs of nodes 16, 16' of the data network 12. The set of provisioned optical data capacities describes properties of the virtual optical network 14' in the overlay structure 10' without describing the physical optical link routes that support these optical data capacities.

From the list of provisioned data capacities, the data network 12 determines an improved admission control and routing scheme for the data communications traffic between the nodes 16, 16' of the data network 12 (step 34). Subsequently, the nodes 16, 16' of the data network 12 implement the improved admission control and routing scheme for managing data communications traffic between the nodes 16, 16' of the data network 12.

The step of determining involves maximizing an objective function that represents the utility of the admission control and routing scheme to the data network 12. The objective function can depend on the physical architecture in the data network 12 and the overlay structure of the optical network 14'. The determination of the admission control and routing scheme also produces a set of values to the data network 12 for the provisioned capacities in the optical network 14'. The set of values includes a total willingness-to-pay by the data network 12 for the traffic routed via the optical network 14 and includes individual values for the willingness of the data network 12 to pay for marginal increases in provisioned capacities on associated individual optical pipes 17' of the optical network 14', i.e., $\{WTP_a\}$. Here, $WTP_a$ is the value of a variable that is monotonic in the amount that the data network 12 is ready to pay for a fixed-size incremental increase in capacity on the corresponding optical pipe "a". For example, each willingness-to-pay may represent a monetary value per Giga-bits per second. Each $WTP_a$ may, e.g., be an actual cost, a price, or a rent for the fixed-size incremental increase in capacity on the corresponding optical piper "a".

The method 30 includes transmitting the set of willingness-to-pays for marginal increases in the provisioned capacities on optical pipes 17', i.e., $\{WTP_a\}$, and the total willingness-to-pay to the optical network 14' (step 36). The willingness-to-pays indicate to the optical network 14 the identities of optical pipes 17' where the data network 12 desires more capacity without disclosing the physical architecture of the data network 12.

FIG. 4 illustrates the sequence 40 of steps that the optical network 12 performs during one iteration of the optimization method.

The sequence 40 of steps includes receiving from the data network 12 a total willingness-to-pay and the set of individual willingness-to-pays for marginal increases in optical data capacities, i.e., $\{WTP_a\}$ (step 42).

From this received data, the optical network 14 determines how to adjust the provisioned optical data capacities on the optical pipes 17' therein (step 44). The determination involves maximizing an objective function that represents a total willingness-to-pay for optical data capacity by the data network 12 minus a cost for provisioning such a capacity in the optical network 14. The determination will tend to increase provisioned optical data capacities on those optical pipes 17' where the corresponding willingness-to-pays are larger and will tend to redistribute the optical data capacities in a way that reduces costs associated with deploying more wavelength-channels, i.e., to match capacity desires of the data network 12. The determining step uses operations data on the physical architecture of the optical network 14 and produces a new set of provisioned optical data capacities, e.g., by adding or removing wavelength-channels on physical optical inks.

The optical network 14 transmits to the data network 12 a list of the new provisions for optical data capacities along individual optical pipes 17' (step 46). This transmitted operations data describes the virtual optical network 14' rather than the physical architecture of the optical network 14.

The sequences 30 and 40 may terminate after a fixed number of iterations or may terminate in response to a determination that the upper and lower bounds of the objective function have evolved to close enough values. At each iteration, the optimization method provides a determination of both upper and lower bounds for the objective function being jointly maximized.

FIG. 5 illustrates the form of the exchanges of operations data between the data network 12 and the optical network 14 during one iteration of the method of FIGS. 3-4. Each exchange includes a transmission from the data network 12 of a total willingness-to-pay and a set of willingness-to-pays for marginal optical data capacity increases on the individual optical pipes 17', i.e., $\{WTP_a\}$, and a transmission from the optical network 14 of the provisioned capacities, i.e., $\{w_a\}$, on the same individual optical pipes 17'.

Figure 6:
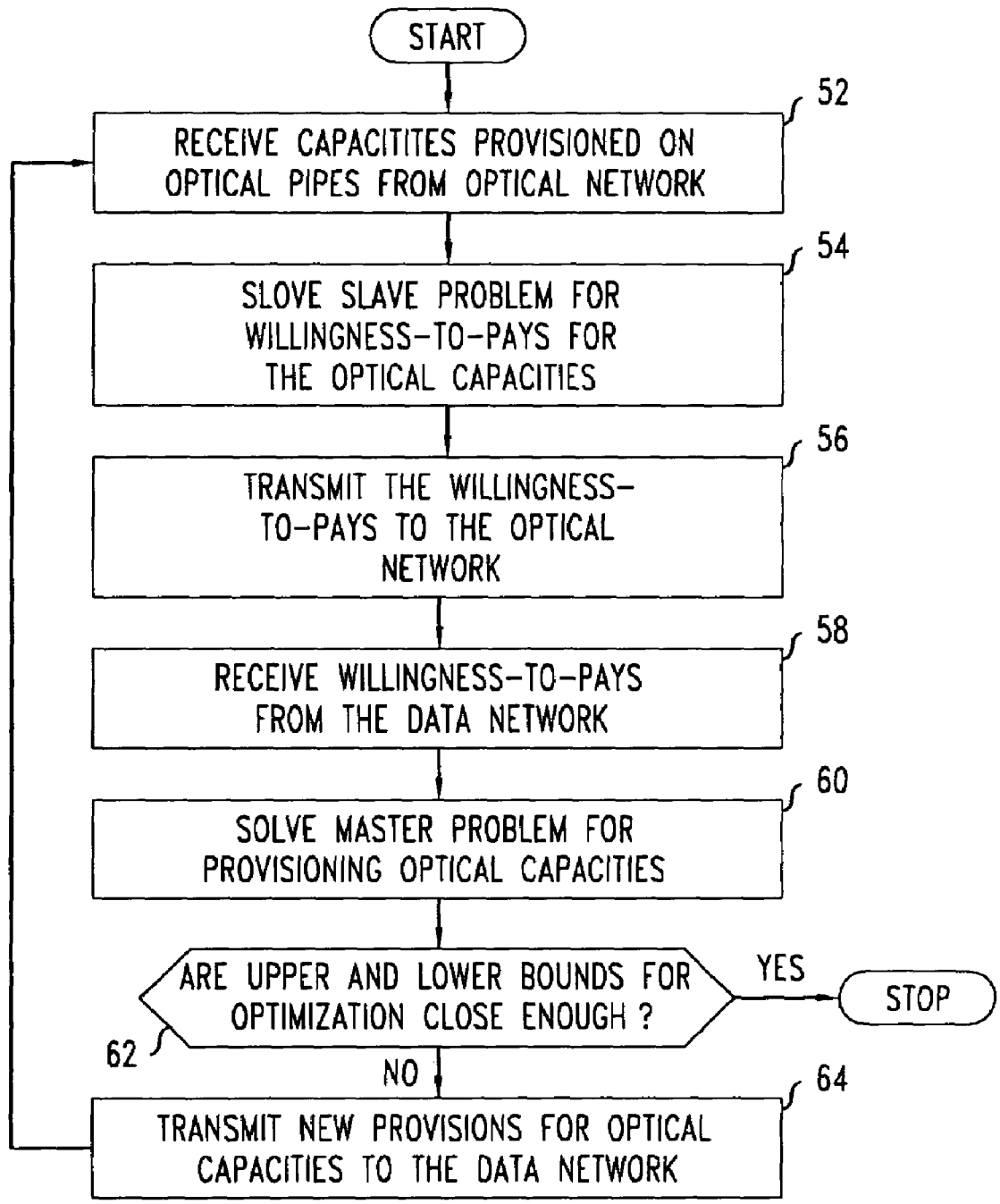
FIG. 6 is a flow chart illustrating a specific embodiment of the method of FIGS. 3-4 in which the data and optical networks solve coupled slave and master problems, respectively.

FIG. 6 illustrates an exemplary method 50 for performing the optimization of FIGS. 3-4 based on a generalized Benders' algorithm. The optimization involves maximizing an objective function, G, that accounts for the utility, U, of a traffic admission control and routing scheme to the data network 12 and the cost to the optical network 14 of provisioning optical wavelength-channels for the admission control and routing scheme. The objective function, G, has the form:

$$G(z,y)=U(z)-(c)^T \cdot y.$$

The function U represents the utility of a traffic distribution to the data network 12. Here, the j-th component, $z_j$, of the vector z is the total data communications traffic between a corresponding pair "j" of nodes 16, 16' in the data network 12. The scalar $(c)^T \cdot y$ represents the total cost of provisioning capacities for the data network 12 on the physical optical links 17 of the optical network 14. Here, the a-th component, $y_a$, of the vector y is the integer number of wavelength-channels that are provisioned on associated physical optical link "a". Also, a-th component, $c_a$, of the vector c represents the cost per channel of provisioning wavelength-channels on the associate optical link "a". In some embodiments, the objective function has a different form.

In particular, for different embodiments, the utility function, U(z), may have different forms. In the various embodiments, the carried bandwidth between a node pair "j" is the minimum of the demanded bandwidth between the pair "j", i.e., $d_j$, and provisioned bandwidth between the pair "j", i.e., $z_j$. In one exemplary form, the utility function, U, is interpreted as a total revenue. That is, $U(z_1,\ldots,z_N)=\Sigma_j \pi_j z_j$ where $\pi_j$ is the revenue paid or billed per unit of traffic between the nodes of pair "j", and the sum in the utility is over all pairs "j" of nodes in the data network 12. In another exemplary form, the utility function, U, implements a form of fairness between the different source-destination node pairs. In particular, $U(z_1,\ldots,z_N)=\min_j (z_j/d_j)$ where $d_j$ is the traffic demand between the nodes of the pair "j". In another exemplary form, the utility function, U, is an expected revenue when the traffic demands, i.e., the $d_j$'s, are random variables that account for demand uncertainty. That is, the probability that a traffic demand $d_j$ is less than "d" is defined by a probability distribution function $F_j(d)$. Then, $U(z_1,\ldots,z_N)=E[\min\{d_j,z_j\}]=\Sigma_j [\int^{z_j}_0 F_j(x)dx+z_j(1-F_j(z_j))]$. In another exemplary form, the utility function, U, implements a price-demand relationship. In particular, the price for traffic between node pair "j", i.e., $P_j$, may be determined from the carried traffic, $z_j$, as $P_j=f_j(z_j)$, e.g., the function $f_j(z_j)$ may be given by $A_j[z_j]^{-b_j}$ where $A_j$ and $b_j$ are constants that depend on the node pair "j". Then, $U(z)=\Sigma_j f(z_j) z_j$ where $f(z_j)$ is a positive non-decreasing concave-down function of the "$z_j$" and the sum is over all pairs "j" of nodes in the data network. In a last exemplary form, the utility function, U, is constructed to enable approximately minimizing aggregated communications delays subject to a condition that the entire traffic demand is carried. Here, $z_j$ is the demand that must be carried between node pair "j". Since the entire traffic demand is carried, the $X_r$'s, which are the traffics carried on associated routes "r", satisfy the constraints $\Sigma_{r \in R(j)} X_r = z_j$ where R(j) is the set of admissible routes joining the node pair "j". These constraints restrict the minimization of the utility function, U. If each link is approximated by a M/M/1 queue, an exemplary utility function has the form: $U(x)=\Sigma_{l \in L_d}[\Sigma_{r:l \in r}(X_r)-q_l]^{-1}$. Here, "l" is a physical link, $q_l$ is the capacity of the link, and $L_d$ is the set of links of the data network.

The maximization of the objective function, G, is subject to conditions on the traffic between nodes 16, 16', 18, of the overlay structure 10'. To describe the conditions it is useful to note that the total traffic "$z_j$" between a pair "j" of nodes 16, 16', 18 is equal to the traffic "$X_r$" over individual paths "r" that connect the pair "j" of nodes 16, 16', 18. That is, $z_j=\Sigma_{r \in R(j)} X_r$ where R(j) is the set of data communication paths connecting the nodes 16, 16' of the pair "j". The path-wise traffic variables, i.e., the $X_r$'s, satisfy constraints imposed by the electronic links 15, 15' and/or optical pipes 17' of the individual data communication paths. In particular, $\Sigma_{r:l \in r} X_r \leq q_l$ and $\Sigma_{r:a \in r} X_r \leq w_a$, wherein $q_l$ and $w_a$ are the provisioned data communication capacities on electronic link "l" and optical pipe "a", respectively. Each virtual optical data capacity "$w_a$" is a function of the number of wavelength channels, i.e., the $y_k$'s, that provision physical optical links "k" of the optical paths in the virtual optical pipe "a". The link constraints can also be written as: $A \cdot X \leq q$ and $B \cdot X \leq w$ where A and B are integer-valued matrices, the vector q has l-th component $q_l$, and the vector w has a-th component $w_a$.

The performance of the method 50 includes interleaving steps (54) of solving a slave problem and steps (60) of solving a master problem. By interleaving the steps (54, 60) of solving the master and slave problems, optimization of the hybrid network 10 can be distributed between the data and optical networks 12, 14 so that the needed exchanges of operations data relate to the virtual optical pipes 17' of the overlay structure 10'. In particular, the optical network 14 performs the step 60 to solve the master problem without receiving data on the actual physical architecture of the data network 12, and the data network 12 performs the steps (54) to solve the slave problem without receiving data on the actual physical architecture of the optical network 14. Each solution of the master problem is based on the physical architecture of the optical network 14 and received values of the willingness-to-pays. Each solution of the slave problem is based on the physical architecture of the data network 12 and received values of the provisioned capacities on the optical pipes 17'.

Each step (54) of solving the slave problem involves maximizing the utility function, U(z), with respect to total traffic values between individual pairs of nodes 16, 16', 18 and is subject to constraints on link capacities in the overlay structure 10'. During the steps (54), the total traffic, $z_j$, between a node pair "j" is subject to the constraint $z_j = \Sigma_{r \in R(j)} X_r$ where R(j) is the set of paths of the overlay structure 10' between the node pair "j". For each electronic link "l" of a data communication path "r", the further constraint is that $\Sigma_{r:l \in r} X_r \leq q_l$ where $q_l$ is the provisioned capacity on the electronic link "l". For each virtual optical pipe "a" of a data communication path "r", the further constraint is that $\Sigma_{r:a \in r} X_r \leq w_a$ where $w_a$ is the provisioned optical data capacity on the optical pipe "a". Thus, the constraints are defined by the physical architecture of the data network 12 and the vector w, which describes the on virtual architecture of the optical network 14'.

The data network 12 receives the set of values for the provisioned optical data capacities, i.e., the vector w, from the optical network 14 (step 52). For example, the data network 12 receives an initial set of values for the vector w prior to the first iteration of the method 50.

To solve the slave problem, a Lagrange multiplier formalism is used, wherein the maximum in z and X of an objective function $\{U(z) + \lambda^T \cdot (w - B \cdot X)\}$ is minimized with respect to the vector $\lambda$. The vector $\lambda$ provides the set of Lagrange multipliers for the optical capacity constraints $B \cdot X \leq w$. The slave problem may, e.g., be solved by conventional convex optimization methods. The solutions provide a maximum value for the utility function $U(z^*)$, i.e., $U^*$, and values of vectors z, X and $\lambda$ at the extremum, i.e., $z^*$, $X^*$, and $\lambda^*$, respectively.

After solving the slave problem, the data network transmits values for an object $\Phi$, i.e., $U^* - (\lambda^*)^T \cdot B \cdot X^*$, and the extreme value of the vector $\lambda^*$ to the optical network 14 (step 56). The object $\Phi$ provides an exemplary measure of the total willingness of the data network 12 to pay for bandwidth in the virtual optical network 14'. The a-th component, $\lambda^*_a$, of the vector $\lambda^*$ is an exemplary measure, i.e., $\lambda^*_a = \partial U^* / \partial w_a$, for the willingness of the data network 12 to pay for a marginal increase of optical data capacity on the virtual optical pipe 17' between gateway node pair "a".

Each step (60) of solving the master problem involves maximizing a proxy for the implicitly defined function $\max\{U(z) - (c)^T \cdot y\}$. The proxy is the object $\Lambda - c^T \cdot y$ where $\Lambda$ is a real variable and the components of y are positive integers. The maximization is with respect to the vectors y and w and is subject to two types of constraints. The vector w has components, $\{w_a\}$, wherein $w_a = \Sigma_{p \in P(a)} X_p$. Here, $X_p$ is the capacity provisioned on physical optical path "p", and P(a) is the set of optical paths between a pair "a" of gateway nodes 18. The constraints restrict the real positive variable $\Lambda$ and the integer components of the vector y. Exemplary methods for solving the mater equation are based on mixed integer programming techniques.

With respect to the vector y, the constraints for solving the master equation are related to physical optical links 17. For each physical optical link "k", a component $y_k$ of vector y satisfies a constraint that $y_k \geq \Sigma_{p:k \in p} X_p$. This constraint ensures that the provisioned optical data capacity on link "k" is sufficient to support the virtual pipe capacities, $X_p$, provisioned on all communication paths "p" that include the physical optical link "k". Additionally, optional exclusion constraints are needed in embodiments of the optical network 14 where provisioning a physical optical path "p" in a set of optical paths P requires that other optical paths of P be not provisioned. In such embodiments, the added constraints that $1 \geq \Sigma_{p \in P} \chi_p$ are imposed. Here, indicator function $\chi_p$ is equal to 1 if the path "p" is provisioned and is equal to "0" otherwise.

With respect to the real object $\Lambda$, the constraints are generalized Benders' cuts. Each generalized Benders' cut provides an upper bound on the implicitly defined function $\max\{U(z) - (c)^T \cdot y\}$. At each iteration, the solution of the slave problem produces one set of values for the objects $\Phi$ and $\lambda^*$, i.e., $\Phi(m)$ and $\lambda^*(m)$ at the iteration "m". Each of the generalized Benders' cut has the form: $\Lambda \leq \Phi(m) + (\lambda^*(m))^T \cdot w(m)$. The constraints on $\Lambda$ include the set of all generalized Benders' cuts that were found in the present iteration and any previous iterations.

Each step (60) of solving the master problem uses the sets $\{(\Phi(m), \lambda^*(m)\}$ rather than detailed information on the physical architecture of the data network 12.

At each iteration, the solutions to the slave and master problems provide a lower bound and an upper bound to the maximization of the object $\{U(z) - (c)^T \cdot y\}$ as subject to the physical constraints. The method 50 includes comparing the upper and lower bounds, e.g., at each iteration (step 62). If differences between the upper and lower bounds are smaller than a preselected amount, e.g., within a preselected percentage of the upper bound, the method 50 stops. Otherwise, the method 50 includes transmitting the new value of the vector w, i.e., the new values of the provisioned optical data capacities to the data network (step 64). The solution of the master equation determines the vector w. The data network uses the new vector w in the next iteration of the optimization algorithm.

In various embodiments, the method 50 includes setting the initial values of the components of the vector w to infinity for the first iteration. Then, the first generalized Benders' cut can produce an upper bound for the object $\{U(z) - (c)^T \cdot y\}$ provided that the utility function U(z) is concave and monotonically increasing in each component of the vector z. For such an initial choice, the second generalized Benders' cut is a plane through the point w=0.

Some embodiments of the hybrid network optimize end-to-end data communications therein by a method that temporally interleaves optimizations of one component network alone with joint optimizations of the data and optical component networks. One such optimization method 70 is illustrated in FIGS. 7 and 8.

Figure 7:
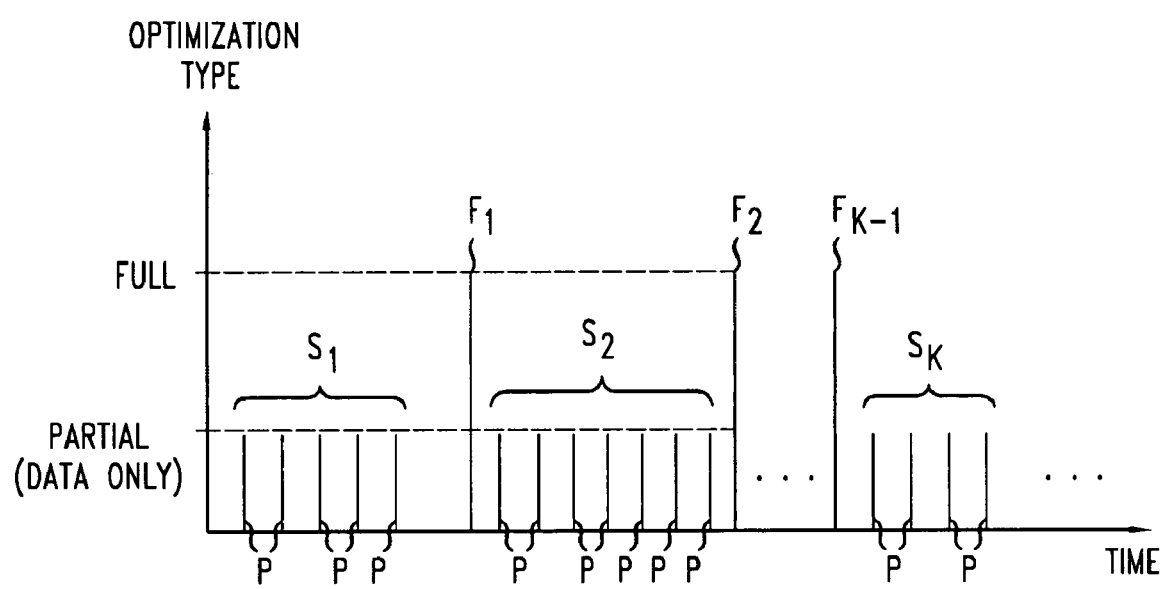
FIG. 7 is a time plot for an optimization method that temporally interleaves sequences of optimizations of a data network alone and joint optimizations of the data network and an optical network together, e.g., in the hybrid network of FIG. 1.

FIG. 7 an exemplary timeline of the optimizations occurring in one such embodiment of a hybrid network, e.g., the hybrid network 10 of FIG. 1. The timeline of the optimizations performed by the hybrid network includes several temporal series, $S_1, S_2, \ldots, S_k$, of partial optimizations, P. In each partial optimization, P, the same single component network of the hybrid network is optimized, i.e., the data network or the optical network. The single component network would, e.g., typically be the data network. In each series, $S_1, \ldots S_k$, the distribution of the partial optimizations, P, may be temporally regular or variable. Also, different ones of the series, $S_1, \ldots S_k$, may have the same or different numbers of the partial optimizations, P. Between each series $S_1, \ldots S_k$ of partial optimizations, P, the timeline includes a full optimization, $F_1, F_2, \ldots F_{k-1}$, of the entire hybrid network. Each full optimization, $F_1, F_2, \ldots F_{k-1}$, involves a joint optimization of both data and optical networks of the hybrid network, e.g., according to methods 30, 40, and 50 as shown in FIGS. 3-6.

Figure 8:
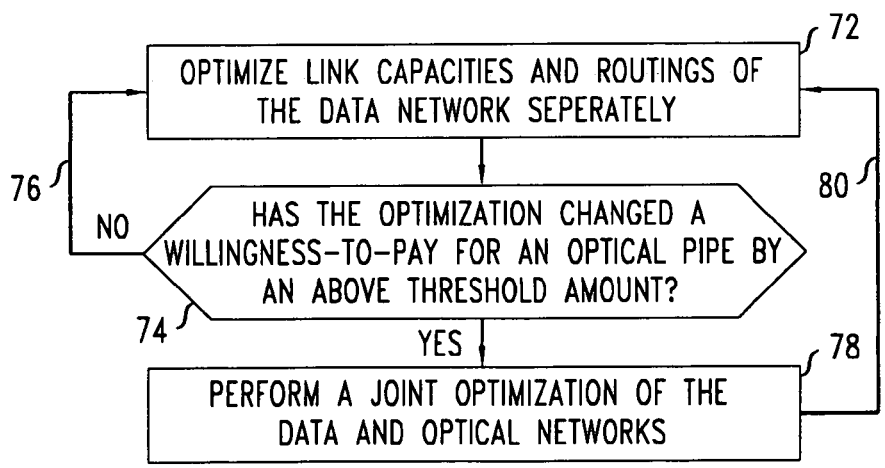
FIG. 8 is a flow chart illustrating steps performed during the method of FIG. 7.

FIG. 8 illustrates an embodiment of a method 70 for interleaving a series of optimizations of the data network alone with joint optimizations of the data network and the optical network together.

The method 70 includes optimizing provisioned data capacities and routing in the data network alone, e.g., by solving the above-described slave problem in each such partial optimization (step 72). The method 70 also includes determining whether each such partial optimization has changed one of the willingness-to-pays for an incremental capacity increase on a virtual optical pipe by an above-threshold amount (step 74). These determinations are made differently in various embodiments. Either the optical network or the data network may make the determinations of step 74. In the former case, the data network transmits updated willingness-to-pays to the optical network after each optimization of step 72. From the updated values, the optical network determines whether a change by an above threshold amount has occurred.

Various embodiments also use different definitions for the threshold amount of step 74. One definition for the threshold amount is a change to a willingness-to-pay that is, at least, as large as the ratio of the cost of adding one wavelength-channel to the associated optical pipe over the total capacity increase associated with such an addition. The data network would be able to evaluate whether an above-threshold change has occurred based in part on the above-described supplemental information. Alternately, the optical network would be able to determine whether such an above threshold change has occurred based on the associated costs and capacity increases and the received updated willingness-to-pays. An alternate definition of the threshold amount of step 74 is a preselected percentage change of one of the individual willingness-to-pay with respect to the previous value for the same willingness-to-pay. Other embodiments may use yet other definitions for the threshold amount of step 74.

In response to a determination of the absence of such an above-threshold change, the method 70 includes looping back 76 to perform another re-optimization of the data network alone. In response to a determination of the presence of such an above-threshold change, the method 70 includes performing a joint optimization of both the data and optical networks of the hybrid network, e.g., by the methods 30, 40, 50 of FIGS. 3-6 (step 78). After completion of the joint optimization, the method 70 includes looping back 80 to perform another optimization of the hybrid network alone, i.e., step 72.

The exemplary optimization method 70 can be advantageous when it is desirable to readjust one component network of a hybrid network more frequently than the other component network in same hybrid network. For example, provisioned data capacities are often smaller and more granular on the physical links of a data network than on those of multi-channel optical networks. For that reason, more frequent optimizations of the data network of a hybrid network may be desirable whereas joint optimizations of the full hybrid network might be unnecessary at the same frequency. That is, significant changes to capacities requirements on optical pipes of an optical network, i.e., changes requiring the addition or removal of a wavelength-channel, should typically occur less often. Thus, it may be more efficient to accommodate temporal traffic variations by frequent and lower overhead optimizations of the data network of a hybrid network alone and by less frequent joint optimizations of the data and optical networks.

Figure 9:
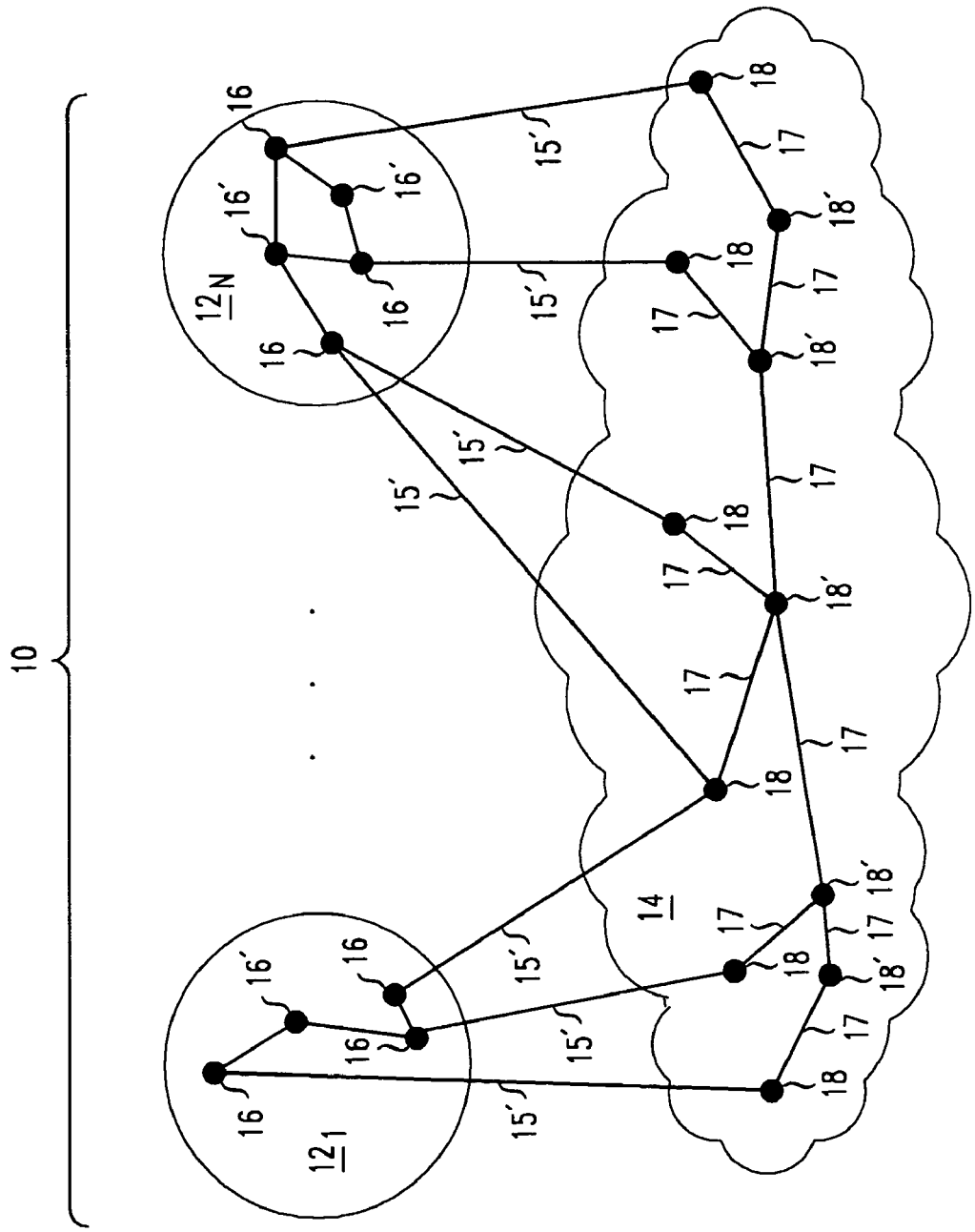
FIG. 9 is a block diagram illustrating an exemplary hybrid network that includes a plurality of data networks interconnected by a single optical network.

Due to the high data capacity of optical networks, a hybrid network 10 may have a single core optical network 14 that interconnects a plurality of separate data networks $12_1$-$12_N$ as shown in FIG. 9. In such a hybrid network 10, each data network $12_1$-$12_N$ includes a collection of electronic links that connect internal nodes 16' and edge nodes 16 of the same data network $12_1$-$12_N$. The core optical network 14 includes internal and edge nodes 18', 18, wherein the edge nodes 18 connect to the edge nodes 16 of the data networks $12_1$-$12_N$. As described with respect to FIG. 1, the edge nodes 18 of the core optical network 14 function as optical gateways for each data network $12_1$-$12_N$. In addition, the core optical network 14 can carry data communications between different ones of the data networks $12_1$-$12_N$. That is, the core optical network 14 interconnects the data networks $12_1$-$12_N$.

The hybrid network 10 of FIG. 9 supports the joint optimization methods 30, 40, 50 of FIGS. 3-4 and 6 and also supports the types of data transfers shown in FIG. 5. In particular, each data network $12_1$-$12_N$ and the core optical network 14 can jointly perform the methods 30, 40, 50. In addition, the hybrid network 10 may be configured to jointly optimization end-to-end data communications between the various data networks $12_1$-$12_N$ by jointly optimizing the core optical network 14 and the entire set of data networks $12_1$-$12_N$ according to the methods 30, 40, 50 of FIGS. 3-4 and 6.

The hybrid network 10 of FIG. 9 may also support the optimization method 70 of FIGS. 7-8, wherein individual ones of the data networks $12_1$-$12_N$ perform multiple optimizations alone between each joint optimization the data networks $12_1$-$12_N$ and the core optical network 14 together.

In various embodiments, the data network $12_1$-$12_N$ of source nodes may decide traffic admission and control even when destination nodes are in others of the data networks $12_1$-$12_N$. Such traffic admission and routing decisions may be to the edge nodes 16 of the destination data networks $12_1$-$12_N$, which are then, responsible for delivery of received traffic. Indeed, each data network $12_1$-$12_N$ may know only the layout of the edge nodes 16 in the other data networks $12_1$-$12_N$. These edge nodes 18 may correspond to border gateway protocol (BGP) speakers as defined in Internet RFC 1965.

From the disclosure, drawings, and claims, other embodiments of the invention will be apparent to those skilled in the art.

What we claim is:

1. A method, comprising:
   in a data network, receiving from an optical network a list of optical data capacities provisioned between pairs of gateway nodes of the optical network, the gateway nodes being physically connected to nodes of the data network, the optical network being configured to transmit data communications on a plurality of wavelength channels; and
   in response to the receiving, transmitting from the data network to the optical network a list of willingness-to-pays, each willingness-to-pay representing a value for increasing the optical data capacity between a corresponding pair of the gateway nodes of the optical network.

2. The method of claim 1, wherein each gateway node connects one or more of the nodes of the data network via a UNI.

3. The method of claim 1, further comprising:
   in response to the receiving, transmitting from the data network to the optical network a value representative of a total willingness-to-pay for optical data capacity in the optical network.

4. The method of claim 1, further comprising:
   determining admission and routings of data traffic between pairs of nodes of the data network based on the received list.

5. The method of claim 4, wherein the determining produces the list of willingness-to-pays.

6. The method of claim 4, wherein the determining includes maximizing a selected utility function with respect to traffic admission and routings between pairs of the nodes of the data network.

7. The method of claim 1, further comprising:
determining an admission control and routing scheme between nodes of the data network based on the received list of provisioned optical data capacities.

8. The method of claim 7, wherein the determining includes producing the list of willingness-to-pays.

9. A method, comprising:
in a multiple wavelength channel optical network, receiving from a data network both a list of willingness-to-pays and a value of an object, each willingness-to-pay representing a value for increased optical data capacity between a corresponding pair of gateway nodes of the optical network, the value of the object representing a total willingness of the data network to pay for bandwith in the optical network;
producing a list of provisions for optical data capacities between the pairs of said gateway nodes based on said received list; and
transmitting said produced list of provisions for optical data capacities to the data network.

10. The method of claim 9, further comprising reconfiguring the number of wavelength channels provisioned along optical links of the optical network in a manner that is responsive to the received list of willingness-to-pays.

11. The method of claim 9, wherein each willingness-to-pay is indicative of a willingness of the data network to pay for a unit of increased data capacity between the corresponding pair of gateway nodes.

12. The method of claim 9, wherein the producing further comprises determining routings of optical data traffic between pairs of the gateway nodes based on the received list.

13. The method of claim 9, wherein the producing includes maximizing a selected objective function with respect to provisioned optical capacities between pairs of the gateway nodes based on the received list and value of the object.

14. The method of claim 9, wherein the optical network is a wavelength-division-multiplexed optical network.

15. The method of claim 9, further comprising repeating the receiving, producing, and transmitting steps to improve end-to-end routing in a hybrid network, the hybrid network including the data network and the optical network.

16. The method of claim 9, further comprising repeating the receiving, producing, and transmitting steps to enable the data network to improve admission control of traffic between nodes of the data network.

17. The method of claim 9, further comprising repeating the receiving, producing, and transmitting steps to enable the data network to improve routing of traffic between nodes of the data network.

* * * * *